United States Patent
Sidorin (10) Patent No.: US 7,355,162 B2
(45) Date of Patent: Apr. 8, 2008

(54) OPTICAL WAVELENGTH MEASURING DEVICE USING GUIDING BODY AND DIFFRACTIVE STRUCTURE

(75) Inventor: Yakov Sidorin, Tucson, AZ (US)

(73) Assignee: Optitune PLC, London (GB)

( * ) Notice: Subject to any disclaimer, the term of this patent is extended or adjusted under 35 U.S.C. 154(b) by 0 days.

(21) Appl. No.: 10/186,684

(22) Filed: Jul. 2, 2002

(65) Prior Publication Data

US 2004/0007662 A1 Jan. 15, 2004

(51) Int. Cl.
*G02B 6/34* (2006.01)
(52) U.S. Cl. .................... 250/227.11; 385/37
(58) Field of Classification Search ............ 250/216, 250/237, 205, 226, 227.11, 237 G; 356/305, 356/328; 359/132, 15; 372/20, 64, 102, 372/9, 29.02; 384/43; 385/129–132, 17, 385/37
See application file for complete search history.

(56) References Cited

U.S. PATENT DOCUMENTS

| | | | |
|---|---|---|---|
| 4,253,060 A * | 2/1981 | Chen | 324/76.37 |
| 4,696,536 A | 9/1987 | Albares et al. | 385/14 |
| 4,993,032 A * | 2/1991 | Bradley | 372/20 |
| 5,299,045 A | 3/1994 | Sekiguchi | 398/95 |
| 5,493,393 A | 2/1996 | Beranek et al. | 356/328 |
| 5,982,962 A | 11/1999 | Koops et al. | 385/37 |
| 6,449,066 B1 * | 9/2002 | Arns et al. | 359/15 |
| 6,839,174 B1 * | 1/2005 | Ohde | 359/574 |

* cited by examiner

*Primary Examiner*—Georgia Epps
*Assistant Examiner*—Tony Ko
(74) *Attorney, Agent, or Firm*—Nixon & Vanderhye P.C.

(57) ABSTRACT

An optical characterization device has a guiding body and a diffractive structure integrated with it. The guiding body delivers radiation to the diffractive structure at a preselected angle and the diffractive structure diffracts at least a portion of radiation guided to it to give spatial resolution according to wavelength. A position sensitive detector detects the position of the spatially resolved radiation and thus the radiation can be characterized according to wavelength. Embodiments can be used to monitor and adjust the wavelength of a radiation source, using a feedback connection. By using the integrated approach, a very small structure can be realized and the structure can be relatively simply fabricated and assembled. The guiding body might be either capable of supporting multimode propagation of the radiation or might be a single mode waveguide. Where it is capable of supporting multimode propagation, an input to the guiding body acts to select a mode for propagation of the radiation.

21 Claims, 6 Drawing Sheets

OPTICAL WAVELENGTH MEASURING DEVICE USING GUIDING BODY AND DIFFRACTIVE STRUCTURE

BACKGROUND

1. Technical Field

The present invention relates to an optical characterisation device, and a method of optical characterisation. It finds particular application in calibrated wavelength monitoring, for instance of optical sources or filters.

2. Related Art

It can be important that the wavelength characteristics of optical sources and filters are known with precision. This is important for example in wavelength division multiplexing (WDM) in optical networks where the wavelengths carried in the networks must be distinguishable from one another and must be individually detectable at a receiver.

It is known to use lasers and/or filters in this kind of environment which have known wavelength characteristics, and it is known to use tunable components so that for instance a WDM scheme can be varied or a replacement device can be adjusted to meet the requirements of a damaged one.

However, the precise spectral performance characteristics of any given device, such as a laser or spectral filter, at any operational point (e.g., bias parameters) are not known a priori, and also can vary with temperature, age, etc. For example, it is not generally possible to predict in advance, reliably and repeatably, the exact voltage which must be applied to a tunable silicon micromachined Fabry-Perot filter in order to tune it to a specific frequency. See, for instance, Sidorin et al, IEEE Photon. Technol. Lett., V11, pp 18-21, 1999. As another example, a spectral filter used in a tunable laser system may have a non-linear tuning characteristic which in turn results in non-linear wavelength tuning of the laser, as disclosed in U.S. Pat. No. 6,192,059, making precise prediction of the spectral performance characteristics of the laser in response to changes in drive voltage to the filter very difficult.

Certain applications, such as WDM in telecommunications as mentioned above, as well as medical instrumentation and optical computing, can suffer from this lack of precision in performance.

Various arrangements are known for monitoring wavelength and correcting its changes. For example, the international patent application published as WO 01/20251 discloses the use of a Fizeau interferometer. In the disclosed arrangement, optical radiation whose wavelength is to be determined is collimated and input to the interferometer which outputs the radiation to a spatial position dependent on its wavelength. The position indicated by a position sensitive detector picking up the interferometer output provides wavelength information which can then be used appropriately, for instance in a feedback loop to correct changes. In a second example, U.S. Pat. No. 6,088,142 discloses an arrangement in which a diffraction device is used to pick off a portion of collimated optical output from a source and diffract it through a filter to a detector. If the wavelength content of the source drifts, the intensity of the filtered radiation at the detector changes. By using more than one filtered output, it is possible to determine the direction of the wavelength drift and thus to correct it.

SUMMARY

According to a first aspect of the present invention, there is provided an optical characterisation device, the device comprising:

i) a guiding body having an input for optical radiation to be guided thereby; and ii) a diffractive structure integrated with the guiding body, the structure being for diffracting at least a portion of guided radiation to give spatial resolution according to wavelength.

Depending on the application of the device, a practical realisation might further comprise:

iii) a focussing element for focussing spatially resolved radiation; and iv) a position sensitive detector for detecting the position of the focussed, spatially resolved radiation, whereby the radiation can be characterised according to wavelength.

Embodiments of the present invention can be used to characterise incoming radiation according to wavelength since an incoming wavelength is spatially resolved by the diffractive structure. By using the integrated approach, a very small structure can be realised, having a footprint of the order of a few $mm^2$, while still achieving an angular dispersion of about 0.1 degree/nm. Further, the structure can be relatively simply fabricated and assembled.

Preferably the guiding body comprises a guiding structure and a substrate. Other devices or components can then be integrated with the guiding structure as required, by being fabricated onto the same substrate.

The guiding body may be capable of supporting multi-mode or single mode guiding and these options may be constructed in different ways. However, in order that the diffractive structure can give spatial resolution according to wavelength, it will at least usually be a requirement that the guiding body should deliver the radiation to the diffractive structure at a preselected angle. A single mode guiding body will do that but in the case of a guiding body that will support multimode guiding, it may be necessary to cause the guiding body to support propagation in one mode only in use. One way of doing this is to provide an optical characterisation device wherein the guiding body is capable of supporting multimodal guiding and the input for optical radiation is adapted to select a mode for optical radiation guided by the guiding body.

For example, in a multimode version, the guiding body may comprise a slide-like element as the guiding structure with a wedged input so that guiding is provided by multiple reflections along the body of the slide-like element, delivering the radiation at a specified angle to the location of a diffractive structure, regardless of the wavelength of the guided radiation. The diffractive structure will then deliver the radiation to a spatial position which is dependent on wavelength.

In an example of a single mode version, the guiding body may comprise a single mode waveguide as guiding structure on or in a substrate which accepts light and delivers it to a Bragg diffractive structure which couples the radiation out, again at a spatial position dependent on wavelength.

In either case, incoming radiation of any wavelength in an expected range follows the same optical path through a guiding structure to a diffractive structure which delivers it to a spatially resolved position on a position sensitive detector.

The position sensitive detector might be a single component whose output indicates the position of incident radiation on the component. Alternatively, the position sensitive detector could comprise a photodetector array. The diffractive structure delivers radiation which is more or less collimated and this can be collected by a lens and focussed. Although the diffractive structure could diffract the radiation out of the guiding body to an external lens, it preferably diffracts it while still travelling in the guiding body to an integrated lens. This again can simplify fabrication and support further integration with other devices and/or components.

Embodiments of the present invention are particularly suitable for use in coarse WDM applications, ie where spectral separation is relatively wide as opposed to dense, with an optical input that has a narrow linewidth since this enhances, or sharpens, the spatial resolution of the position sensitive detector and thus the wavelength detection and monitoring. Embodiments are thus suitable for example for use in calibrating or characterising laser sources, or filters, for wavelength division multiplexing in communications.

Wavelength detection and monitoring techniques and apparatus can also be used with a feedback mechanism so as to control the wavelength of an optical radiation source. Embodiments of the invention may thus also provide wavelength control apparatus comprising an optical characterisation device according to the first aspect of the present invention, wherein the apparatus further comprises a detector for detecting wavelength change and feedback control means for controlling the wavelength of optical radiation input to the device in response to a detected wavelength change. Wavelength control apparatus of this type can for instance be used to provide novel wavelength referencing, or wavelength locking, apparatus for adjusting a tunable Fabry-Perot filter and/or tunable laser diode, so that the device may be tuned to a precise wavelength.

As well as apparatus, embodiments of the present invention can also provide methods, such as: a method of detecting the presence of a wavelength in optical radiation, which method comprises the steps of:
i) coupling the radiation into a guiding body;
ii) guiding the radiation by means of the guiding body to a diffractive structure;
iii) diffracting the radiation at the diffractive structure;
iv) focussing the diffracted radiation; and
v) monitoring for the presence of focussed radiation at a position appropriate to said wavelength.

Such a method can be extended to include the use of a feedback arrangement to adjust one or more wavelengths of optical radiation for tuning purposes. For instance, the radiation coupled into the guiding body might be received from a source which is to be tuned. If the position of the monitored radiation changes, it may be necessary to retune the source and this can be done using an embodiment of the present invention to achieve precise wavelength tuning, for example of a tunable Fabry-Perot filter and/or tunable laser diode.

Various forms of diffractive structure can be used. For example, a rectilinear grating could be produced on the surface of the waveguiding body, or a volume grating could be embedded in it, or a different form of diffractive structure could be used, such as a Fresnel zone plate or the like.

Embodiments of the present invention have various advantages, some of which are mentioned above. Some further advantages are:
they can utilise known and readily available diffraction grating fabrication technologies only well-established processing operations—such as waveguide fabrication, polishing and thin-film deposition—are required practically any optical material that is transparent within the spectral region of interest can be used for the guiding body, which warrants the flexibility of a fabrication process and increases the overall cost efficiency of the system an integrated solution for the guiding body and diffractive structure simplifies fabrication, optical alignment and integration with other devices and components and thus again keeps costs down. Further, its integration with a tunable system such as a laser source or frequency filter can simplify thermal management and can produce very compact physical layout and simplified packaging.

the proposed design lends itself to array scalability and batch processing in manufacture

BRIEF SUMMARY OF THE DRAWINGS

An optical characterisation arrangement will now be described as an embodiment of the present invention, by way of example only, with reference to the accompanying drawings in which:

FIG. 2;

It should be noted that the Figures are not drawn to scale but are each schematic only.

DETAILED DESCRIPTION OF EXEMPLARY EMBODIMENTS

Broad Principle of Operation

Figure 1:
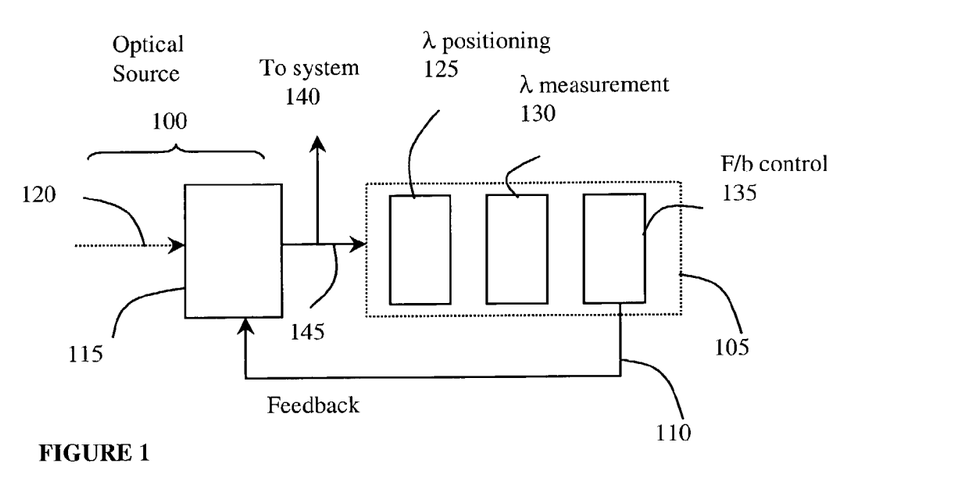
FIG. 1 shows a schematic block diagram of an optical characterisation arrangement with feedback control of a source.

Referring to FIG. 1, an embodiment of the present invention provides an integrated arrangement and a method for monitoring the wavelength of incoming optical radiation and producing a signal when the wavelength changes. The signal can be used in a feedback loop to adjust the wavelength to keep it constant.

Such an arrangement might be used where radiation from an optical source 100 is being used to supply an optical system (not shown) which is wavelength sensitive. It is necessary to control the wavelength of radiation input 140 from the source 100 to the system. To do that, an optical characterisation arrangement based on an embodiment of the present invention picks up radiation from the source 100 and inputs it to a wavelength monitoring and feedback assembly 105. The feedback is used to tune the source 100 appropriately.

The wavelength monitoring and feedback assembly 105 is important. It performs the functions of:
 spatial redirecting 125 of incoming radiation from the source 100 according to wavelength
 wavelength measurement 130 based on the spatial redirection 125
 feedback control 135 to the optical source 100 to adjust the wavelength as required Thus wavelength measurement is used to adjust behaviour of the optical source 100. The optical source 100 might be for example a tunable laser source, standing alone and operating in the lowest order transverse mode, or it might be a combination of incoming radiation 120 from the source 100 with a tunable filter 115, such as a tunable Fabry-Perot filter. This incoming radiation may be optically combined with or switched from another incoming optical signal. In each case however, the optical source 100 produces a narrowband input to the wavelength monitoring and feedback assembly 105.

The primary function of the wavelength monitoring and feedback assembly 105 is the first, achieving spatial redirecting of radiation according to wavelength. In general, this is provided by a component which directs all incoming radiation along a common path and delivers it to a diffractive structure which diverts it angularly according to wavelength. Incoming radiation can then be diverted to a unique position determined by its wavelength and can therefore be detected by its spatial location. This light-directing function can be provided for example by a single mode waveguide or by another appropriate guiding body. In either case, incoming radiation is diverted angularly to a unique position determined by its wavelength and can therefore be detected by its spatial location.

Figure 2:
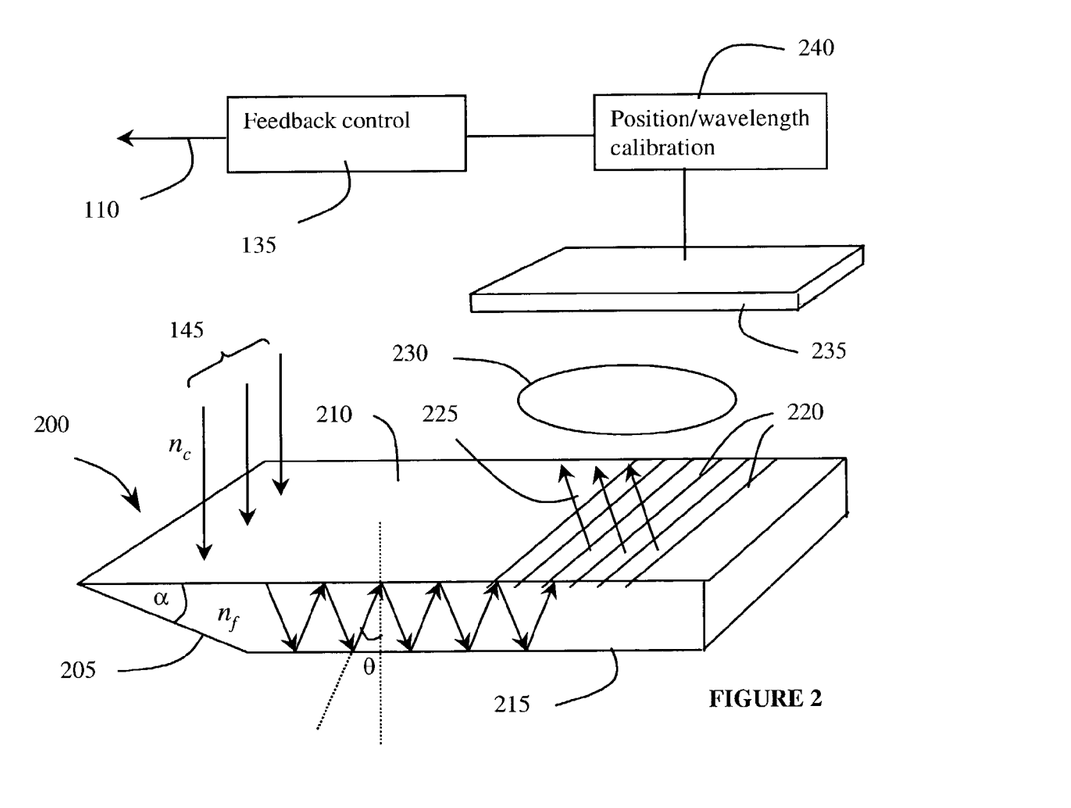
FIG. 2 shows schematically, in three-quarter view, a multimode version of an optical characterisation device used in the arrangement of FIG. 1.

Referring to FIG. 2, in an embodiment of the wavelength monitoring and feedback assembly 105, collimated incoming radiation 145 from a source 100, tuned to a wavelength $\lambda_i$, is coupled into a guiding body 200 which is a plane-parallel plate. The guiding body 200 in practice is capable of supporting multimode propagation of optical radiation along it. In order that radiation propagates along it following a common path, the guiding body 200 is provided with an input region which is a bevelled or wedge-shaped structure. This input region selects a single mode of propagation for the optical radiation along the guiding body 200. In practice, the wedge-shaped input also selects the angle at which the radiation will be presented to the diffractive structure 220.

In more detail, the guiding body 200 comprises a light-guiding slide-like structure 200 with parallel opposing faces 210, 215. The structure 200 has a wedged end with a planar upper surface, provided by one of the parallel opposing faces 210, and an angled lower surface 205. Radiation 145 to be coupled into the slide-like structure 200 is incident normal to the upper surface 210 and is reflected into the body of the slide-like structure 200 by the angled lower surface 205. The angled lower surface 205 is arranged to give an apex angle of the wedged end of "α". Once reflected at the slanted end surface 205, total internal reflection at the parallel opposing faces 210, 215 guides the radiation along the slide-like structure 200 to an out-coupling grating 220, in this case a rectilinear diffraction grating designed to be a transmission grating, fabricated on the upper surface 210 of the slide-like structure 200.

(It will be noted that terms such as "upper", potentially indicating a particular orientation, are used in this description. It is not intended to imply that any particular orientation should be used and the terms are used only for convenience of the description and with reference to the orientation that happens to be shown in the relevant figures.)

The collimated incoming radiation 145 provides a beam of light of width W. Regardless of the wavelength $\lambda_i$ of the radiation, it will follow the same path along the slide-like structure 200 and this path can be analysed using simple ray-approximation. The incoming beam 145 is incident on the top surface of the wedged end of the structure 200 through a medium of refractive index $n_c$ and will be reflected at the slanted end surface 205 at an angle equal to the apex angle α, in a medium of refractive index $n_f$. The apex angle α is constrained by the relation $\alpha \geq 0.5 \arcsin(n_c/n_f)$ to satisfy the requirement of total internal reflection along the slide-like structure 200. For instance, if the slide-like structure 200 is made of Corning glass #7059 ($n_f \approx 1.54$ at the wavelength of 1550 nm) and is situated in air, then the apex angle α should exceed approximately 20.3°.

To reduce unwanted noise upon demultiplexing, the length $L_w$ of the wedged end of the structure 200, in a direction along the slide-like structure 200, cannot be chosen independently but based on the first-order analysis should satisfy $L_w \geq W \cos \alpha$. Additionally, it is important that the input beam is positioned to avoid multiple reflections occurring between the surfaces of the wedged end of the structure 200 since this would mean some radiation following an incorrect path along the slide-like structure 200.

The out-coupling grating 220 diffracts the radiation to produce angular resolution according to wavelength. Because the incoming radiation 145 has a narrow linewidth, the out-coupled radiation 225 at a given wavelength in practice has a very narrow angular spectrum. A lens 230 collects the out-coupled radiation 225 and focuses it onto a position sensitive detector 235. This gives a signal indicative of the position of the focused radiation on the position sensitive detector 235 which can be translated into a value representative of $\lambda_i$ by a calibrated conversion device 240, calibrated to take into account the dimensions and physical arrangement of the slide-like structure 210, lens 230 and position sensitive detector 235. The translated value for $\lambda_i$ can then be used by a suitable feedback control mechanism 135 for tuning the optical source 100.

A suitable feedback control mechanism 135 might take several different forms, depending on the nature of the optical source 100. It might for example be arranged to change the drive current or temperature of a laser, or to change the voltage applied to an electro-optically tunable filter. The calibrated conversion device 240 might be set in any suitable way to trigger the correct feedback. For example, it might be set to output a zero value to the feedback control 135 as long as the signal indicative of the position of the focused radiation on the position sensitive detector 235 is correct for incident radiation having a wavelength $\lambda_i$. Then as soon as there is a change, the calibrated conversion device 240 might start to output a positive or negative signal to the feedback control 135.

The position sensitive detector 235 in practice will have a power detection threshold. Various known techniques might be used to reduce power loss in the arrangement. For example, the receiving surface for the incoming radiation 145 to the slide-like structure 200 may be anti-reflection coated with a coating selected to be effective over a broad spectral bandwidth centred around the central wavelength of the expected tuning range. Other surfaces of the slide-like structure 200 used to guide the radiation by reflection may on the other hand be coated with a highly reflective coating.

In the above, the diffraction grating 220 will deliver the radiation to the lens 230 at an angle "$\theta_{diff}$" which can be derived from the basic grating equation:

$$m\lambda = \Lambda(n_{diff} \sin \theta_{inc} + n_{inc} \sin \theta_{diff}) \quad (1)$$

where:
m is the order of diffraction
λ is the free-space wavelength of the radiation 145
$n_{diff,inc}$ are the average refractive indices in the diffraction and incident media, respectively
Λ is the grating period
$\theta_{diff,inc}$ are the angles of diffraction and incidence of the radiation on the grating 220, respectively.

The angular dispersion characteristic of the grating, "D", for diffraction in transmission in the $m^{th}$ order, can be derived from (1) to give $$D = \frac{d\theta_{diff}}{d\lambda} = \frac{(n_{diff} \sin\theta_{diff} + n_{inc}\sin\theta_{inc})}{n_{diff}\lambda\cos\theta_{diff}} \quad (2)$$

The diffracted optical radiation having wavelength $\lambda_i$ is delivered by the lens 230 onto an "$i^{th}$" segment "$A_i$" of the position sensitive detector 235. If there is then a shift in the wavelength of the incoming radiation 145, to a wavelength $\lambda_N \neq \lambda_i$, the lens 230 will deliver the diffracted radiation to a different position, for instance segment "$A_N$". The output of the position sensitive detector 235 to the calibrated conversion device 240 will therefore change and the calibrated conversion device 240 will now output a different signal to the feedback control 135.

A slide-like structure 200 might be provided by a plane-parallel plate made of material with uniform index of refraction, $n_f$, with top and bottom surfaces 210, 215 that are of optical quality, for instance polished to optical specifications. The thickness of the plate should exceed the value of the wavelength of the incoming optical radiation 145 by at least a couple of orders of magnitude. For instance, where the incoming radiation 145 is expected to have a central wavelength $\lambda_i \approx 1.51$ μm, the thickness of the plate 200 should be more than about 150 microns.

In a simple case, the plate 200 may be fabricated from an optical microscope glass slide of high-quality, or from a wafer of optical material that is transparent over the expected wavelength range. Alternatively, a more complex solution would be to form a several hundred micron thick film of known optical material on a substrate of any optical material with lower refractive index, suitable for integration. It may be accomplished, for example, by thick-coating a substrate with hybrid sol-gel materials, followed for instance by polishing to provide an optical quality wedged input end.

Figure 3:
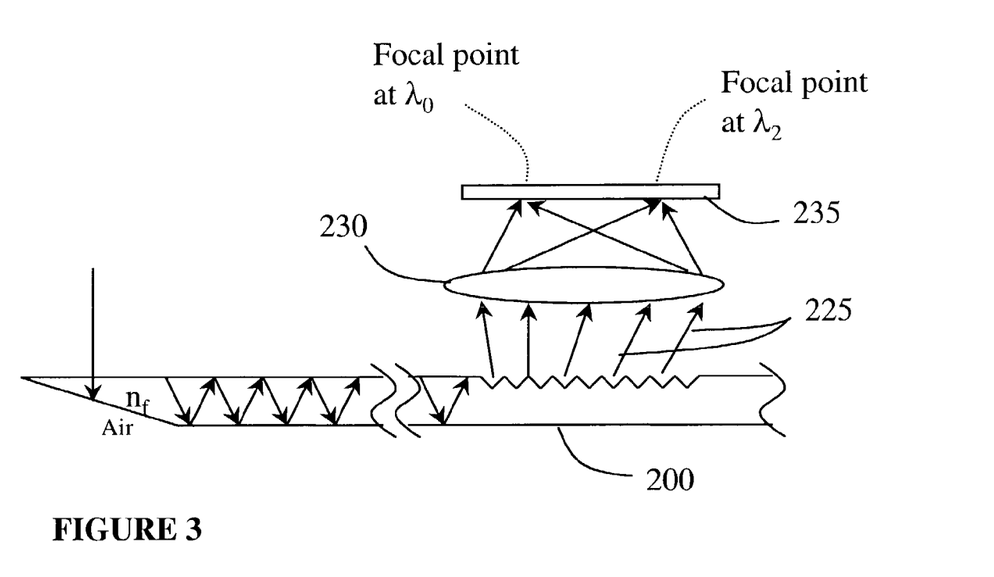
FIG. 3 shows a cross section through the optical characterisation device of FIG. 2, having a transmission grating as a diffractive structure.

Referring to FIG. 3, the delivery of diffracted radiation 225 to the position sensitive detector 235 can be seen for different wavelengths. The diffracted directions for five different wavelengths are indicated by the arrows shown. Radiation at two of these wavelengths, $\lambda_0$ and $\lambda_2$, is then shown being focussed to different respective focal points on the position sensitive detector 235.

In the arrangement described above with reference to FIGS. 2 and 3, the diffraction grating 220 is a transmission grating and the radiation is diffracted out of the slide-like structure 200 by the grating. This type of arrangement, a grating coupler, is well-known in integrated optics and substantial analysis is published, for example, in *"Optical Integrated Circuits"* by H. Nishihara, M. Haruna and T. Suhara, McGraw Hill, New York, 1989. The lens in this arrangement might be refractive, as shown, or diffractive.

Figure 4:
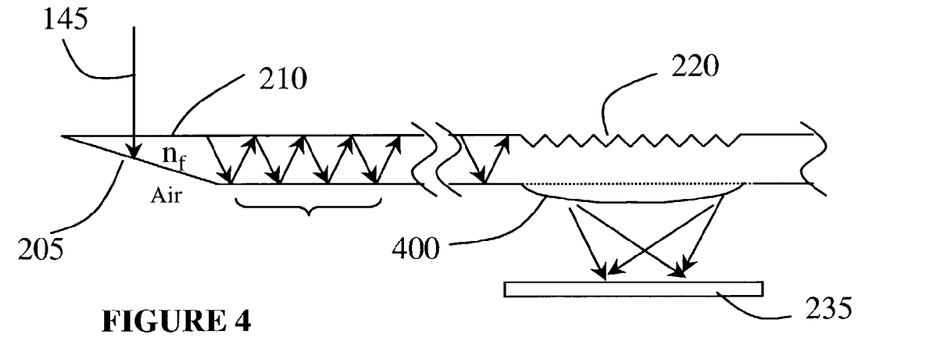
FIG. 4 shows a cross section through the optical characterisation device of FIG. 2, having a reflection grating as a diffractive structure, and an integrated lens.

Referring to FIG. 4, in an alternative arrangement, a reflection grating 220 can be used and this supports a significantly more compact design. The separate lens 230 can be replaced by an integrated lens 400 on the surface of the slide-like structure 200 facing the grating 220. The integrated lens 400 might be either hybrid or homogeneous. For example, a refractive lens 400 can be defined using a photosensitive material, such as a photoresist, polymer, or photosensitive hybrid-glass, directly on the surface of the slide-like structure 200 using photolithography.

Alternatively, a separately fabricated lens can be mounted on the surface of the slide-like structure 200. In a further alternative arrangement, a diffractive lens could be formed, for example by etching the surface with an electron or other beam, or photo-defined or lithographically defined using sol-gel materials (see for example the techniques disclosed by Ari H. O. Karkkainen et al, in "Siloxane-based hybrid glass materials for binary and greyscale mask photoimaging", published in Advanced Materials, v.14, pp.535 . . . 540, 2002)

Figure 5:
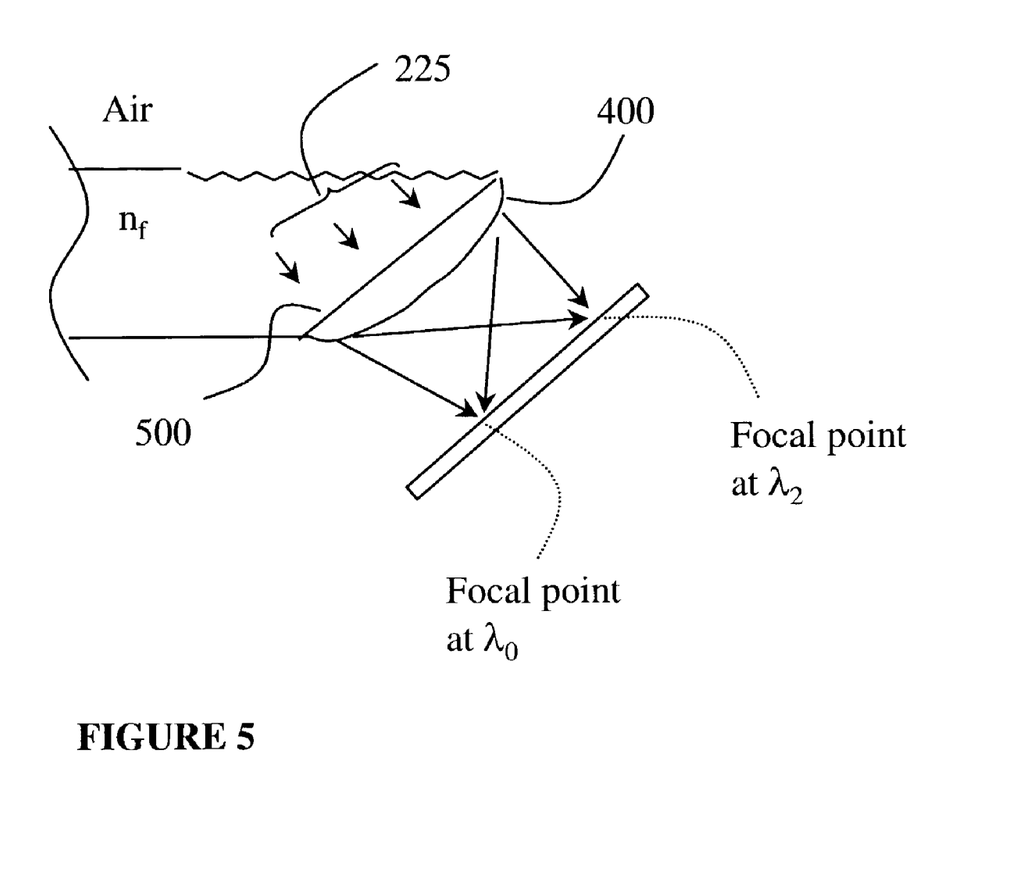
FIG. 5 shows a cross section through the optical characterisation device of FIG. 2, being a variation of the arrangement shown in FIG. 4.

Referring to FIG. 5, in another alternative arrangement the out-coupling end of the slide-like structure 200 is also wedge-shaped and the lens 400 is positioned on the sloped end surface 500.

In a first example of a multimode arrangement of the type shown in FIG. 2, a collimated beam 145 of input radiation from an optical source 100 is intended to have a free-space wavelength of $\lambda_0 = 1550$ nm. The slide-like structure 200 comprises an optically polished plane-parallel plate which is 3 mm thick, 10 mm long and 3 mm wide. The material of the plate 200 is SK10 glass with a uniform refractive index of $n_f(\lambda_0) = 1.6038$. At the input to the plate 200, the wedged end with a slanted end surface 205 is formed by polishing to produce an apex angle α of about 22.9°. Both major surfaces 210, 215 of the plate 200, including the slanted end surface 205, are coated with a thin-film high-reflectivity stack consisting, for example, of alternating quarter-wave layers of indium tin oxide (ITO) and magnesium fluoride ($MgF_2$). Transparent windows are patterned into the reflective materials to provide the entry and exit points for the optical radiation being monitored.

The angle of incidence of TE-polarized radiation onto the grating 220 is defined by twice the apex angle α and is therefore 45.8°. The grating 220 is a transmission grating designed to operate in the first order of forward diffraction in air at an angle of about 40.1° for the wavelength $\lambda_0 = 1550$ nm. It has a period of about 864 nm and is 0.5 mm long. As will be appreciated from FIGS. 2-4, 6 and related text herein, an exemplary optical characterization device includes a diffractive structure that is periodic in a direction parallel to the guiding direction of the guiding body.

The polarisation of the radiation will usually be determined by the system, for instance the laser or filter, delivering it. It could be either TE or TM polarised. Either polarisation will usually be propagated in a guiding body supporting multimode propagation and any difference only occurs at the grating 220 where diffraction efficiency can be affected (in known manner). The situation is a little different in the type of embodiment shown in FIG. 6 where a single mode waveguide is used in the guiding body 200. Here it may be important to take into account any polarisation sensitivity of the waveguide and to select an appropriate polarisation if necessary. Again this is a known effect.

The collecting lens 230 is anti-reflection coated and has a focal length of about 5 mm and can be chosen from a variety of commercially available lenses (see, for instance, Melles Griot catalog). It is placed a couple of millimeters away from the grating 220 and so as to focus the diffracted radiation 225 onto the position sensitive detector 235.

In a second example of a multimode arrangement of the type shown in FIG. 2, a collimated input beam 145 is intended to have a free-space wavelength of $\lambda_0$=980 nm. The slide-like structure 200 is provided by an optically polished plane-parallel quartz plate 200 which is 5 mm thick, 10 mm long and 3 mm wide, having a uniform refractive index of $n_f(\lambda_0)$=1.53532 for TE-polarized light. At the input to the plate 200, the wedged end is 1 mm long and has a slanted end surface 205 formed by polishing to produce an apex angle $\alpha$ of 25°. Both major surfaces 210, 215 of the plate 200, including the slanted end surface 205, are coated with a thin-film high-reflectivity stack consisting, for example, of alternating quarter-wave layers of antimony oxide ($Sb_2O_3$) and $MgF_2$. Transparent windows are again patterned into the reflective materials to provide the entry and exit points for the optical radiation being monitored.

The grating 220 is 0.5 mm long and designed to operate in reflection, in an arrangement according to FIG. 5. Its diffraction parameters are as follows: first order of diffraction, angle of incidence −50°, angle of diffraction 50°. The grating 220 is a surface relief grating with a period of about 480 nm. It is formed in the surface of the plate 200 using electron-beam lithography.

Diffracted radiation is collected and focused onto the position sensitive detector 235 by a quartz plano-convex lens 400 with 5 mm focal length that is glued to the bevelled surface 500 of the plate 200. The angle of the bevelled surface 500 is 50° so that the diffracted radiation 225 at $\lambda_0$ is incident perpendicular to it.

Figure 7:
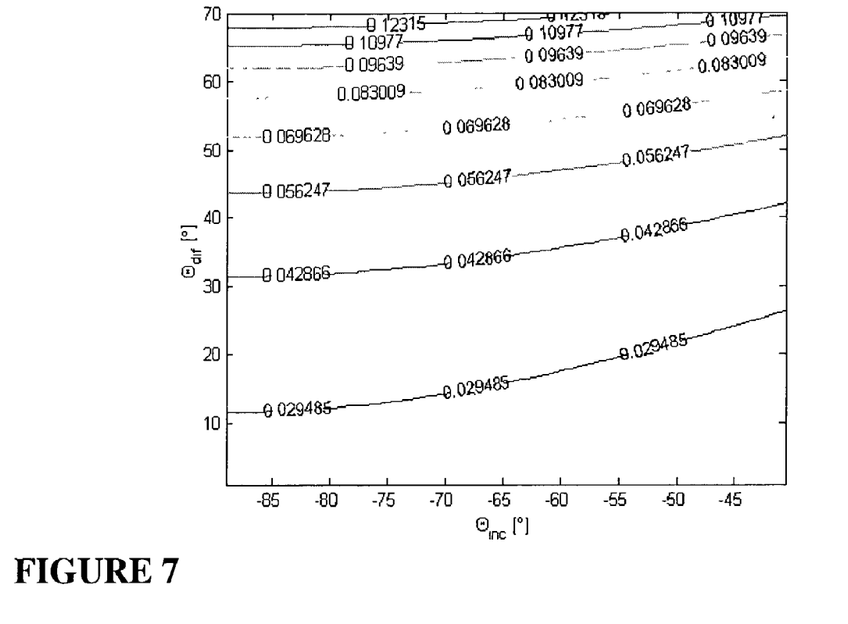
FIG. 7 shows contour plots for values of angular dispersion for radiation at a single wavelength delivered to a detector (which can be achieved using an arrangement such as that shown in FIG. 5) as a function of angles of incidence and diffraction.
Figure 8:
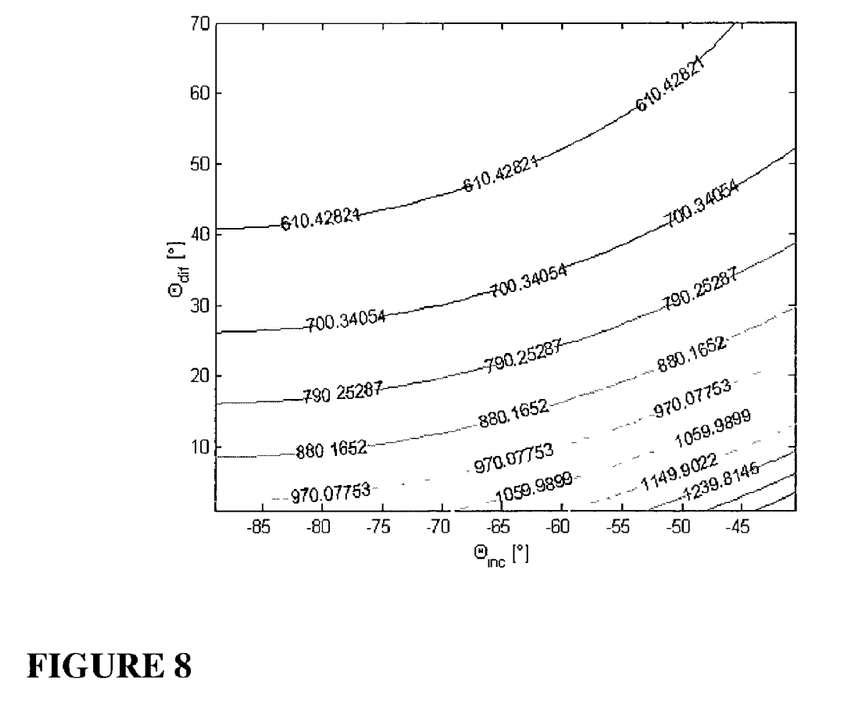
FIG. 8 shows contour plots for the values of diffraction grating period (which can be achieved using an arrangement such as that shown in FIG. 5) as a function of incident/diffracted angles at a single wavelength.

Referring to FIGS. 7 and 8, a first-order performance of an arrangement as shown in FIG. 5 can be described. Both FIGS. 7 and 8 relate to a slide-like structure 200 of fused quartz, using a reflection grating 220 in the fundamental first order of diffraction. Incoming radiation has a free-space wavelength of 1550 nm.

From FIG. 7 it can be seen that the angular dispersion for radiation incoming at an angle of incidence on the grating 220 of about −50° and a diffracted angle of about 65° is about 0.1 degree/nm.

FIG. 8 demonstrates that a period of diffractive grating element required to achieve the angular dispersion of 0.1 deg/nm under abovementioned conditions would be of the order of 570 nm.

A factor which will limit useful angular dispersion by the grating is the degree of angular spreading which occurs during propagation of the radiation in the guiding body 200 where it has a structure which supports multimode propagation, such as that shown in FIGS. 2 to 5. The degree to which the radiation spreads before reaching the grating can be affected by several aspects, such as the length and the material of the guiding body 200 and the degree of collimation of the incoming radiation 145. These are all known or measurable effects but need of course to be taken into account.

As mentioned above, it is also possible to use a single mode waveguide as a guiding body. A single mode waveguide is capable of delivering optical radiation to a diffractive structure so that the diffracted radiation is spatially resolved according to wavelength. Further, it does not need a wedged end with a slanted end surface 205, as described above. Instead, the incoming radiation 145 can be input directly to the end of the waveguide.

Figure 6:
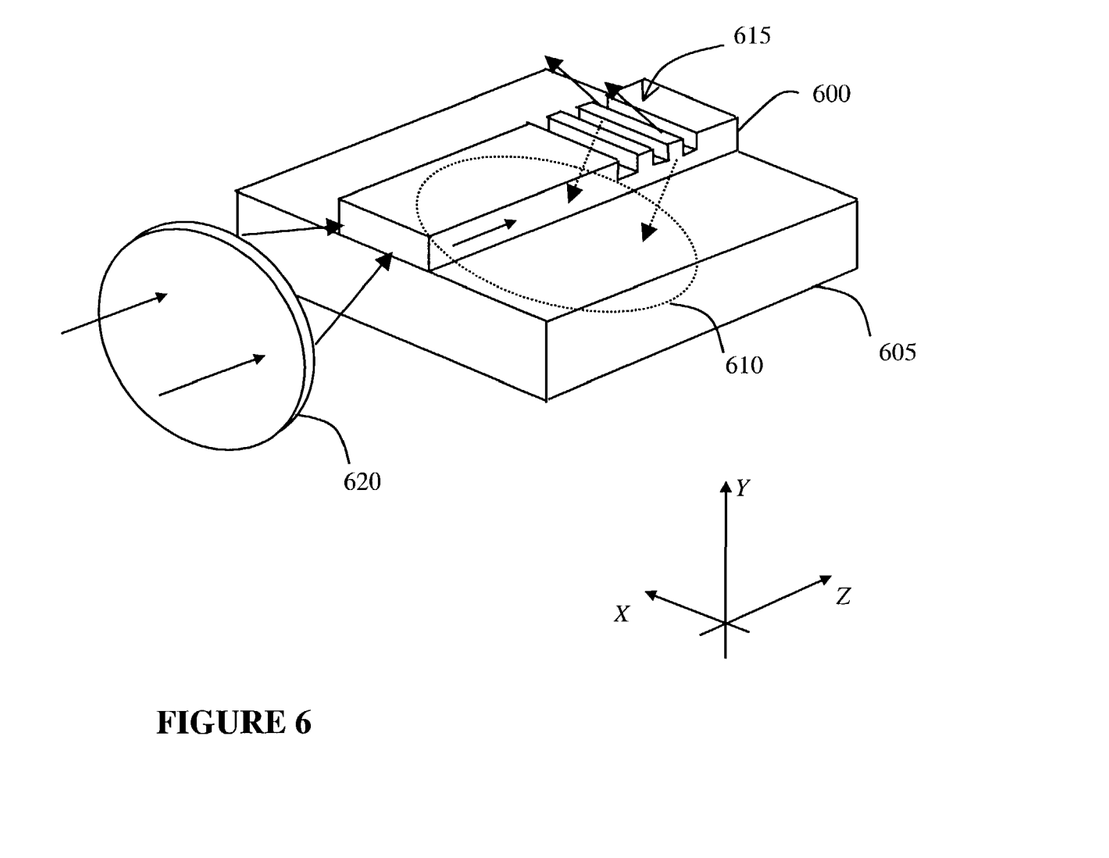
FIG. 6 shows a single mode version of an optical characterisation device used in the arrangement of FIG. 1.

FIG. 6 shows a single mode waveguide embodiment of the invention. Practically any type of waveguiding element 600 could be used as long as it maintains its single-mode performance across all of the expected wavelength range of the wavelength monitoring and feedback assembly 105 in use. Examples of waveguide types which could be used are buried, ridge, loaded, tapered and field or stress induced and these can be fabricated onto or into a substrate 605. Such an arrangement lends itself particularly well to integration with further optical devices and components since it is possible for the further optical devices and components to be fabricated on the same substrate 605.

The waveguide 600 is again provided with a diffraction grating 615 to couple radiation out towards a position sensitive detector 235 (not shown in FIG. 6) in a direction dependent on wavelength. This might again act effectively as a transmission grating, coupling radiation directly out of the waveguide 600 away from the substrate 605, or a reflection grating which couples the radiation into the substrate 605. It may be desirable in some applications that coupling occurs in both directions. Where a reflection grating is used, it is possible to construct a focussing lens 610 on the exposed surface of the substrate 605 (away from the waveguide) to pick up the diffracted radiation.

It is known to use an integrated optic grating structure simply to couple optical radiation out of a single mode waveguide to another waveguide or device. Arrangements of this type are typically analyzed by using, for example, coupled mode theory. An example of such analysis can be found in H. Nishihara, M. Haruna and T. Suhara, Optical Integrated Circuits, McGraw Hill Publishing, NY, 1989. In the arrangement shown in FIG. 6, the following theory is applicable.

In operation, a guided wave propagates along an optical axis which is normal to the single-mode waveguide modal phase front, toward the grating 615. The axis lies in the z-direction along the waveguide 600 as shown. The wave has a propagation constant $\beta_0 = N_{eff} k_0$ where $N_{eff}$ is the effective refractive index for the mode and $k_0$ is a free-space propagating constant. The mode passes through at least a portion of the region of the waveguide 600 carrying the grating structure 615.

The grating 615 in this particular case has a constant period and, whether of a surface relief type or an index-modulation type, it lies transverse to the incident mode (ie the lines of the grating are not parallel to the vector $\beta_0$.

In the following paragraphs, a "thin" grating is a grating in which the depth of the grating along the "Y" axis, normal to the surface it sits in or on, is relatively small. For instance, this applies where the depth of the grating is about an order of magnitude smaller than the wavelength of the radiation to be diffracted, or less. In contrast a "thick" grating can be considered to occupy a significant part, say more than half, of the volume of the radiation to be diffracted.

A thin grating that extends along the waveguide may be mathematically expressed using Fourier expansion, and contains the spatial harmonics mK, where m is an integer and K is the grating vector that is normal to the lines of the grating 615. K is correlated with the fundamental grating period Λ according to $K=2\pi/\Lambda$.

For a thin grating to couple a mode out of the waveguide 600, often described as a guided-mode to radiation-mode coupling, the phase-matching relation $$\beta_m = \beta_0 + mK$$

has to be satisfied, where $\beta_m$ is the propagation constant for the outcoupled mode.

In this thin grating case, if $|\beta_m|<n_c k_0$ or $|\beta_m|<n_s k_0$, where $n_c$ and $n_s$ are the refractive indices of the material above the waveguide 600 (air as shown in FIG. 6) and the substrate 605 respectively, the mth harmonics (or orders) radiate into the material above the waveguide 600 and/or the substrate 605 at angles that are defined, respectively, by phase-matching of z-components (ie $k_0 \sin \theta$) of the propagation vectors:

$$n_c k_0 \sin \theta_{c,m} = n_s k_0 \sin \theta_{s,m} = \beta_m = N_{\mathit{eff}} k_0 + mK$$

For thick gratings, such as index-modulation gratings that extend across the whole waveguide mode, or volume holographic gratings, the phase-matching condition has to be satisfied for both z- and y-components of the propagation vectors.

It is possible to use an asymmetric waveguide 600. In that case, waveguiding requires $n_c < n_s < N_{\mathit{eff}} < n_f$. It follows that radiation coupled out by the grating 615 is limited to orders $m \leq -1$, and an order results in radiation into either the substrate 605 alone or into both the material above the waveguide 600 and the substrate 605.

A major advantage of using a single mode waveguide is that it considerably simplifies the input of radiation to be wavelength monitored. Indeed, all that might be done is to provide a polished end facet of the waveguide 600 together with a simple lens 620 for focussing the radiation onto the end facet, or in some cases an integrated coupling arrangement typically named in the literature as "butt-coupling" might be preferred for the reasons of minituarization and packaging of the final product.

Single-mode waveguide fabrication can be done using known integrated optic materials and technologies such as photolithography, thin-film deposition (including thermal evaporation, electron-beam evaporation, RF-sputtering, spin and dip coating, chemical vapour deposition), epitaxial growth, ion-etching, sol-gel technologies, ion-exchange and ion-implantation.

In an example of a single mode arrangement of the type shown in FIG. 6, a single-mode rib waveguide 600, 5 micron wide and 3 micron thick, is formed from glass with refractive index $n_f=1.53$ on a glass substrate with refractive index $n_s=1.51$ using RF-sputtering and sequential reactive ion etching. The waveguide 600 is positioned in air and supports a lowest order TE-mode field of $\lambda_0=1.55$ μm with effective refractive index $N_{\mathit{eff}}(\lambda_0)=1.5165$.

The input facet of the waveguide 600 is polished normal to the guiding direction of the waveguide 600. Radiation is coupled into it using a lens 620.

A rectangular profile 50%-duty cycle grating 615 is used to couple diffracted radiation out of the waveguide 600. The grating 615 has a period of 570 nm and depth of 50 nm and is designed to operate in reflection to send the diffracted radiation into the substrate 605 (fundamental diffraction order m=−1) at 52.8°. Such a grating can be formed on the surface of the waveguide 600 using an electron-beam writing technique. A focusing lens 610 is integrated on the exposed surface of the substrate 605 to deliver diffracted radiation to the position sensitive detector 235.

This last design produces an angular dispersion of about 0.11 deg/nm in the 1550 nm spectral region.

Figure 9:
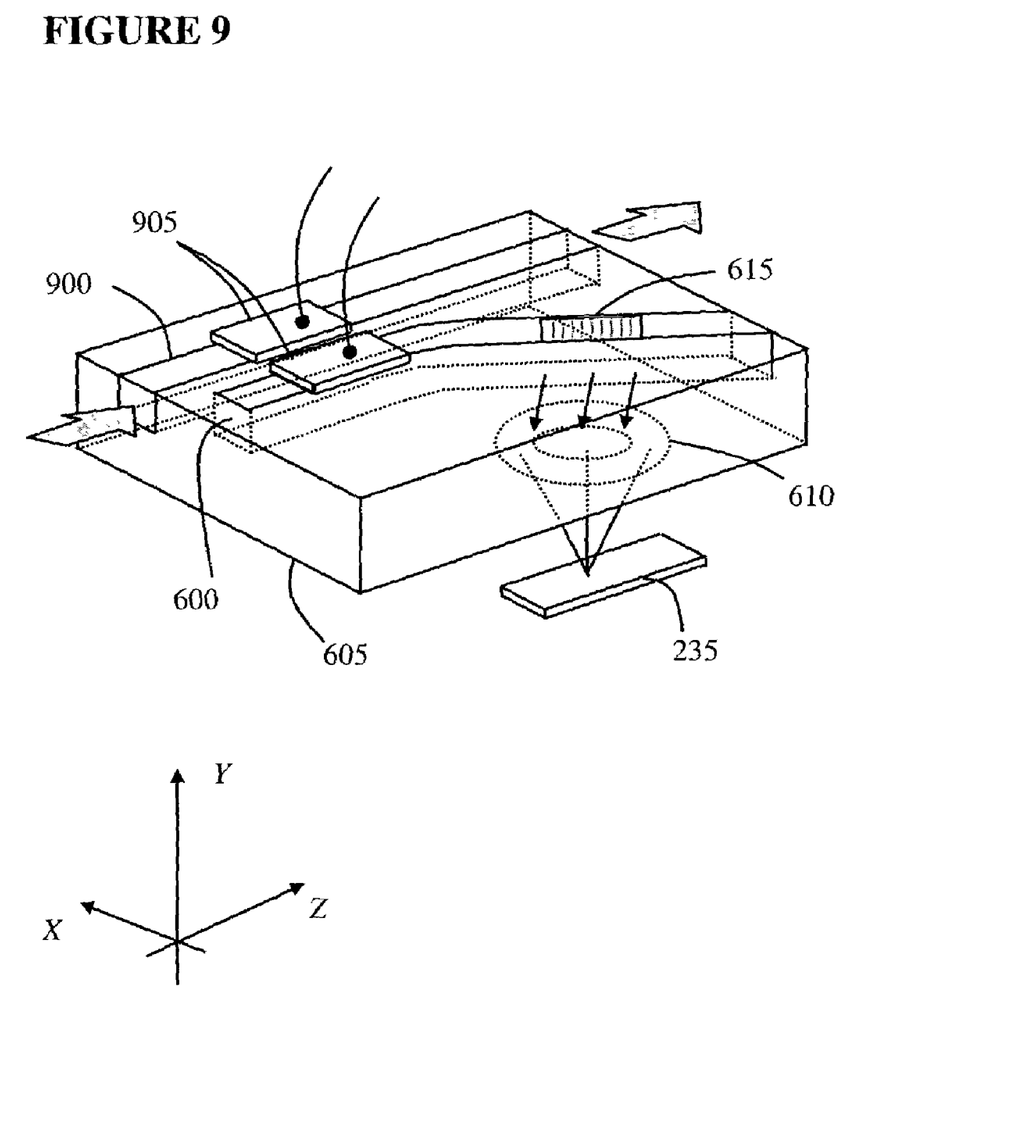
FIG. 9 shows a generalized alternative arrangement for coupling optical radiation into a waveguiding optical characterisation device of the general type shown in FIG. 6.

Referring to FIG. 9, an alternative arrangement for coupling optical radiation into a waveguide 600 on a substrate 605 exploits the substrate 605 for further integration. In this arrangement, a waveguide 900 which is part of an optically integrated assembly, for instance an optical transmitter, is mounted on the same substrate 605 as the waveguide 600 of the wavelength monitoring and feedback assembly 105. Electrically controllable coupling means 905 can be used to switch at least some of the light from the main waveguide 900 to the monitoring waveguide 600 (such coupling arrangements are known and are not further described herein). Thereafter, the operation of the wavelength monitoring and feedback assembly 105 in terms of using a grating 615 for spatial separation of the incoming radiation and detection using a position sensitive detector 235 is as described above in relation to FIG. 6.

Arrangements for the Position Sensitive Detector 235

In each case, the position sensitive detector 235 is located adjacent to the focal plane of the collecting lens 230, 400, 610 and is used to determine the position of maximum power delivered by the lens. The position sensitive detector 235 generates an electrical output based on the position of the detected diffracted radiation on it. Linear position sensitive detectors 235 suitable for use are known and commercially available from for example Pacific Silicon Sensor Inc or iC-Haus Corporation.

As mentioned above, it is also possible to use an array of detecting elements such as a one- or two-dimensional matrix of charge-coupled devices (CCDs). Each element acts as a pixel and the resolution of the matrix will depend on the centre-to-centre separation distance between neighbouring elements. To achieve the best resolution available with such an array, the size of the focal spot delivered by the lens 230, 400, 610 to the matrix should not exceed the area of a pixel, for example of the order of 50 to 100 μm². CCD-based arrays are known and available for example from Apogee Instruments Inc, these latter providing pixel dimensions down to 9×9 μm².

It will usually be necessary to calibrate a wavelength monitoring and feedback assembly 105 using input radiation of known wavelength or wavelength range from an independent reference source since the behaviour of each one will be heavily subject to the exact physical layout and characteristics, such as the focal length and resolution of the lens 230, 400, 610 as well as the resolution of the position sensitive detector 235.

Arrangements for Tuning, Monitoring and Locking.

To determine the wavelength of radiation received at the position sensitive detector 235, the electrical output of the position sensitive detector 235 can be compared to reference electrical signals corresponding to known wavelengths. Any differences can be used by feedback control 135 to adjust the conditions of the optical source 100, such as the bias signal applied to a tunable laser or tunable filter, to tune it to a required wavelength.

For example, assuming that a tunable laser source driven by bias current $I_i$ generates a signal at wavelength $\lambda_i$, which is detected by the position sensitive detector 235 at position $Z_i$. If it is desired to tune the laser so that it generates the light at a given ITU wavelength, then the bias signal applied to the laser will be adjusted until the position of the maximum detected power (focal point of the lens 230, 610) on the calibrated position sensitive detector 235 corresponds to the desired wavelength.

Once the position of the maximum optical signal at a required wavelength for a position sensitive detector 235 has been determined, it can be continuously monitored. Any drift indicates that the operating wavelength of the optical source 100 has changed and feedback is required to re-instate the operating wavelength of the source 100.

It might be noted that a possible limitation in embodiments of the present invention is dispersion effects in the guiding body 200, 600 which may tend to reduce useful spectral bandwidth over which the arrangement can be used.

Materials

Materials that might be used in embodiments of the present invention include many known materials which are transparent in a spectral region of interest. Where a waveguide structure is to be used, then a material would of course need to be capable of use in fabricating a waveguide. Particular examples of materials that might be used are as follows:

glasses such as silicate, phosphate and photosensitive glasses;
photonic crystals such as $LiNbO_3$ and $LiTaO_3$;
silicon (Si);
silicon dioxide ($SiO_2$) on Si;
sol-gel materials, including conventional polymers such as PMMA, polystyrene and polycarbonate, polyimides, colloidal $SiO_2$—based materials, photo-patternable siloxane-based hybrid glass materials (which offer flexibility for tuning and optimization of the material's optical properties as well as mechanical properties) and other hybrid organic-inorganic sol-gel materials A rectilinear grating structure is generally shown and described above. However, it is not essential that such a grating structure be used. For example, gratings having curved lines, such as a Fresnel zone plate, might be found suitable, or grating structures having varying curvatures and/or periods. Such gratings may well be used for instance to present different types of spatial resolution of the incident radiation.

What is claimed is:

1. An optical characterization device, the device comprising:
   i) a parallel sided guiding body having an input for optical radiation to be guided thereby;
   ii) a diffractive structure integrated with the guiding body, the structure being arranged to provide guided-mode to radiation-mode coupling so as to diffract at least a portion of guided radiation out of said guiding body and to give spatial resolution according to wavelength;
   iii) a focussing element for focussing spatially resolved radiation; and
   iv) a position sensitive detector for detecting the position of the focussed, spatially resolved radiation,
   whereby the optical radiation can be characterized according to wavelength.

2. An optical characterization device as in claim 1 wherein the guiding body provides single mode waveguiding.

3. An optical characterization device as in claim 2, wherein the guiding body comprises a single mode waveguide on or in a substrate, which waveguide delivers radiation to a diffractive structure which couples at least part of the radiation out of the waveguide, at a spatial position dependent on wavelength.

4. An optical characterization device as in claim 3 wherein the diffractive structure comprises a Bragg diffractive structure.

5. An optical characterization device as in claim 1 wherein the guiding body comprises a guiding structure and a substrate.

6. An optical characterization device as in claim 5 wherein the diffractive structure is arranged to diffract at least a portion of guided radiation out of said guiding body, in a direction away from the substrate.

7. An optical characterization device as in claim 5 wherein the diffractive structure is arranged to diffract at least a portion of guided radiation in a direction so as to provide guided-mode to radiation-mode coupling into the substrate out of said guiding body.

8. An optical characterization device as in claim 1 wherein the guiding body is capable of supporting multimodal guiding and the input for optical radiation is adapted to select a mode for optical radiation guided by the guiding body.

9. An optical characterization device as in claim 8, for use with collimated input radiation, wherein the input for optical radiation is adapted to couple the optical radiation into the guiding body at a preselected angle to the parallel sides thereof so as to deliver it, in use, at a specified angle to the location of the diffractive structure.

10. An optical characterization device as in claim 9 wherein the input has a cross section which is at least partially tapered to provide an optical path which is incident normal to a plane surface on entry to the guiding body, followed by guiding along the structure by reflection at the parallel sides.

11. An optical characterization device as in claim 9 wherein the diffractive structure is arranged to diffract at least a portion of guided radiation out of said parallel sided structure through a parallel side thereof.

12. An optical characterization device as in claim 11 wherein the diffractive structure is a transmission grating.

13. An optical characterization device as in claim 11 wherein the diffractive structure is a reflection grating arranged to diffract at least a portion of guided radiation out of said parallel sided structure through a lens on a surface of the parallel sided structure facing the grating.

14. An optical characterization device as in claim 1 wherein, in use, the diffractive structure diffracts the radiation to a focussing element integrated with the guiding body.

15. An optical characterization device as in claim 1 wherein the diffractive structure comprises a rectilinear grating.

16. An optical characterization device as in claim 1 wherein the diffractive structure comprises a non-regular grating structure.

17. Wavelength control apparatus comprising an optical characterization device as in claim 1, wherein the apparatus further comprises a detector for detecting wavelength change and feedback control means for controlling the wavelength of optical radiation input to the device in response to a detected wavelength change.

18. A method of detecting the presence of a wavelength in optical radiation, which method comprises:
   i) coupling the radiation into optical characterization device according to claim 1;
   ii) guiding the radiation by means of the guiding body to the diffractive structure;
   iii) diffracting the radiation at the diffractive structure out of said guiding body;

iv) focussing the diffracted radiation; and v) monitoring for the presence of focussed radiation at a position appropriate to said wavelength.

19. An optical characterization device as in claim 1 wherein the diffractive structure is integrated adjacent to an end of the guiding body.

20. An optical characterization device as in claim 1 wherein the diffractive structure is periodic in a direction parallel to the guiding direction of the guiding body.

21. An optical characterization device as in claim 1 wherein the diffractive structure comprises a grating coupler.

* * * * *